United States Patent
Stenfors

(10) Patent No.: US 9,470,432 B2
(45) Date of Patent: Oct. 18, 2016

(54) VENTILATION DEVICE WITH ALTERNATING AIRFLOW

(75) Inventor: Erik Stenfors, Hallstahammar (SE)

(73) Assignee: Tempeff North America Ltd., Winnipeg, MB (CA)

( * ) Notice: Subject to any disclaimer, the term of this patent is extended or adjusted under 35 U.S.C. 154(b) by 906 days.

(21) Appl. No.: 12/994,777

(22) PCT Filed: Dec. 22, 2009

(86) PCT No.: PCT/SE2009/051485
§ 371 (c)(1),
(2), (4) Date: Nov. 26, 2010

(87) PCT Pub. No.: WO2010/074641
PCT Pub. Date: Jul. 1, 2010

(65) Prior Publication Data
US 2011/0076933 A1 Mar. 31, 2011

(30) Foreign Application Priority Data
Dec. 23, 2008 (SE) ........................................ 0850182

(51) Int. Cl.
*F25D 17/06* (2006.01)
*F24F 12/00* (2006.01)
*F28F 27/02* (2006.01)

(52) U.S. Cl.
CPC ........ *F24F 12/006* (2013.01); *F24F 2012/007* (2013.01); *F28F 27/02* (2013.01); *Y02B 30/563* (2013.01)

(58) Field of Classification Search
CPC ...................................... F25D 17/06
USPC .......................................................... 454/237
See application file for complete search history.

(56) References Cited

U.S. PATENT DOCUMENTS

| 5,515,909 A | 5/1996 | Tanaka |
| 2006/0199512 A1* | 9/2006 | Lee et al. ..................... 454/237 |
| 2006/0270335 A1 | 11/2006 | Kim et al. |

FOREIGN PATENT DOCUMENTS

| EP | 1672290 | 6/2006 |
| GB | 2160968 | 1/1986 |
| WO | 2004072559 | 8/2004 |

* cited by examiner

*Primary Examiner* — Steven B McAllister
*Assistant Examiner* — Samantha Miller
(74) *Attorney, Agent, or Firm* — Adrian D. Battison; Ade & Company Inc

(57) ABSTRACT

The application relates to a ventilation device adapted to alternately direct a first (3) and a second (5) airflow to a first (7) and a second (9) heat-absorbing body in order to achieve a heat transfer between the two airflows. The device comprises a first (11) and a second (13) integral connection element adapted to allow communication with the first and the secondheat-absorbing body, and a third (15) and a fourth (17) integral connection element adapted to allow conduction of the first and the second airflow to and/or from the device. The device further comprises an airflow control arrangement (19) connected with the integral connection elements via control arrangement openings and adapted to alternately direct the airflows to the respective integral connection elements.

7 Claims, 2 Drawing Sheets

VENTILATION DEVICE WITH ALTERNATING AIRFLOW

TECHNICAL FIELD

The present invention relates to a ventilation device adapted to alternately direct a first and a second airflow to a first and a second heat-absorbing body in order to achieve a heat transfer between the two airflows.

PRIOR ART

Heating and cooling the interior of buildings consumes large amounts of energy, generating costs both in terms of monetary and environmental losses. One source of energy loss is building ventilation where indoor air at a desired temperature is exchanged for outdoor air having a none-desired temperature, so that the introduced air must continuously be either heated or cooled. One method for decreasing the energy consumption comprises exchanging heat energy between the incoming and outgoing air. One such method comprises alternately letting the incoming and outgoing air heat and cool two heat energy absorbing bodies. For example, if the temperature of the outdoor air is cooler than the desired indoor air temperature, in a first state the outgoing air heats a first body, while the incoming air is heated by a second body which has previously been heated by outgoing air, and in a second state, the outgoing air heats the second body while the incoming air is heated by the now warm first body.

One device commonly used for directing an incoming and an outgoing airflow to alternately pass through two heat-absorbing bodies comprises a box-like housing provided with four openings arranged one on each side of the housing, and one or more shutter plates arranged to rotate inside the housing for alternately directing the airflows between one of two openings to the heat-absorbing bodies. One drawback with this construction is that since the openings must necessarily be located one on each side of the housing due to the construction of the shutter plates, the air ducts leading to the device will extend in different directions, so that it becomes difficult and expensive to install the device in a ventilation system, especially in a pre-existing ventilation system.

In U.S. Pat. No. 7,059,385 another example of a ventilation device for alternating two airflows is shown. The device comprises two heat-absorbing bodies arranged in parallel and provided with rectangular openings for allowing an airflow therethrough. The openings are connected with two air ducts, such that each air duct covers half of both openings. The device further comprises rotating deflectors arranged between the bodies and the air ducts, and provided with two openings which each have an area of about one quarter of the deflector's surface area. By rotating the deflectors 90 degrees the two deflector openings are moved to allow airflow from only one of the air ducts to each body, and hence the airflows may be alternated through the bodies. One drawback with this device is that the airflow will mostly be concentrated to the half of the body which is open to the deflector opening. Thus the efficiency of the device will be decreased, especially since the deflector openings will allow communication with a different half of the body for each respective air flow. Furthermore, since the airflows are intended to be alternated about once every minute throughout the lifetime of the device, wear on the moving components of the ventilation device is quite severe, and it is both difficult and expensive to make a disc-like deflector resistant to fatigue.

SUMMARY OF THE INVENTION

One object of the present invention is to indicate a ventilation device in the field of energy recovery that is simple to install and has a long lifetime.

This object is achieved with the device according to the preamble of claim 1, which is further characterized in that it comprises an air passage that connects a control arrangement opening on one side of the airflow control arrangement in fluid connection with an integral connection element located on another side of the airflow control arrangement.

By the addition of such an air passage the connections to the air ducts leading the airflows to the device may be arranged at any desired location on the device. Thus, the installation of the device is simplified as the air ducts leading to the device may be connected to the device from any desired direction. Furthermore the design of the device may easily be adapted to fit specific ventilation system geometries in order to simplify installation. Also, the airflow control arrangement itself may be optimized with less regard having to be paid to the desired external geometry of the device, giving a more reliable and a more efficient airflow control arrangement for alternating the airflows.

A heat-absorbing body is preferably made with a material and shape adapted to efficiently transfer heat to, and absorb heat from, an airflow passing through the body. Preferably the body is designed to have a large surface area to allow the rapid transfer of heat energy to and from the airflow. According to one embodiment the body comprises a plurality of thin metal plates stacked together and arranged to form a multitude of air channels between the plates for conducting the airflows.

The airflow control arrangement is adapted to alternately direct the airflows to the respective integral connection elements, such that the two airflows alternately are directed to first one and then the other(s) of the heat absorbing bodies. The device and the airflow control arrangement may also be adapted to direct three or more airflows to desired connections, if applicable. The airflow control arrangement preferably comprises one or more baffles, shutters or dampers arranged within an arrangement space, in order to receive and direct one or more airflows into different directions. Preferably the airflow control arrangement comprises two control arrangement openings per airflow, in order to both receive and exhaust the airflow. Preferably the airflow control arrangement is adapted for controlling the direction of at least two airflows.

An integral connection element is defined as being an integral part of the device adapted for the connection of ventilation components to the device. Preferably the integral connection element comprises an integral connection opening adapted for connection with a ventilation component, such as a heat-absorbing body, and preferably with an external ventilation component, such as an external heat-absorbing body or an external air duct. The external air duct may be part of a ventilation system for leading an airflow into or out of a building. An integral connection element may also be adapted for connection with other forms of devices common within ventilation applications, such as fans, filters etc.

In this application an opening can comprise one or more holes for leading airflows into or out of the opening. The direction of an opening is referred to as a vector which, unless stated otherwise, is pointing outwardly from the centre of the opening relative to the body on which it is arranged. The control arrangement openings to the airflow control arrangement may also be provided with one or more baffles, shutters or the like for controlling the airflow within the airflow control arrangement.

According to one embodiment of the invention the air passage is arranged to conduct the airflow to pass around the airflow control arrangement to another side of the airflow control arrangement. Thus, the airflow control arrangement may be constructed and adapted in order to have a long lifetime and high efficiency without any special attention needing to be taken with respect to either the geometry of a pre-existing ventilation system or the design of the other parts of the ventilation device. Furthermore, any control arrangement openings in the airflow control arrangements may be connected with any integral connection element. Preferably, the air passage comprises a side channel arranged to pass beside the airflow control arrangement. The ventilation device according to the invention may also comprise two or more such air passages.

Preferably, the air passage is further arranged to connect the control arrangement opening with an integral connection element located at the opposite side of the air control arrangement. Thus the air passage connects an integral connection element with the control arrangement opening farthest from the integral connection element. This arrangement simplifies the connection of the remaining integral connection elements to other control arrangement openings to the airflow control arrangement, which gives a smaller and more efficient ventilation device as a whole.

According to one embodiment of the present invention at least two of the integral connection elements comprise integral connection openings oriented to face in the same direction. Thus the ventilation device comprises integral connection elements allowing connecting of air ducts or other ventilation components to the same side of the ventilation device. This is an advantage if the external air ducts or ventilation components are provided on the same side of the device, since it is then not necessary to use auxiliary air ducts to connect the ventilation device with the external air ducts. This gives a very compact construction of the ventilation device and also simplifies installation of the ventilation device.

According to one embodiment of the present invention at least two of the integral connection elements connected with two opposite control arrangement openings to the airflow control arrangement comprise integral connection openings oriented to face in the same direction. Many efficient prior art airflow control arrangements direct the airflows perpendicularly to their previous flow direction. Hence, the corresponding control arrangement openings for two separate airflows are usually located on opposite sides of the airflow control arrangement. External ventilation components adapted to supply or receive the two separate airflows to or from the device are also often located close to each other, as are the heat-absorbing bodies. Thus it is an advantage if two integral connection elements intended for different airflows, which thus are connected to opposite sides of the airflow control arrangement, also comprises integral connection openings oriented in the same direction. This is possible due to the use of the air passage.

Preferably, one integral connection element is connected with a control arrangement opening at an end opposite to the control arrangement opening connected with the air passage. Preferably, the integral connection element connected with the air passage and the integral connection element connected with the control arrangement opening at the opposite side of the airflow control arrangement relative to the control arrangement opening connected with the air passage, comprises integral connection openings oriented to face in the same direction. Thus the air passage is used to its fullest extent. Preferably, two integral connection elements connected with two control arrangement openings arranged perpendicularly to the control arrangement opening leading to the air passage also comprise integral connection openings oriented to face in the same direction. Thus, both the two integral connection openings leading to the heat absorbing bodies and the two integral connection openings leading to the interior or exterior of a building are oriented in the same direction.

According to one embodiment of the present invention at least one integral connection element is shaped to form an air flow channel leading to the air flow control arrangement. Preferably at least two integral connection elements are shaped to form air flow channels to the air flow control arrangement. Thus the integral connection elements are directly connected with the airflow control arrangement which decreases the length of the airflow path inside the device and also allow a more compact design of the device. Preferably, an airflow channel is substantially straight without turns. Preferably, at least two of the air flow channels comprise portions which are substantially parallel with each other. Preferably the two parallel portions also share a wall with each other. This gives a very compact construction for the ventilation device. Furthermore, if the channels lead different airflows, heat transfer may take place between the airflows across the shared wall portion, contributing to increasing the overall efficiency of the device.

According to one embodiment of the present invention two airflow channels are connected with control arrangement openings arranged on opposite sides of the airflow control arrangement. Preferably, these two airflow channels are also connected with control arrangement openings arranged perpendicular to the control arrangement opening to the air passage. Preferably, the airflow channels comprise portions arranged substantially parallel with each other. Preferably, the two airflow channels are also oriented perpendicularly to their respective control arrangement openings. Thus, the airflow channels lead the airflows in the transverse direction to the airflow control arrangement and then the airflow enters (or leaves) the airflow control arrangement by a control arrangement opening in a side-wall of the airflow channel. Thus it becomes simpler to orient the airflow channels and the integral connection openings in a common direction.

Preferably, the integral connection element connected with the air passage and an integral connection element connected with a control arrangement opening at the opposite side of the control arrangement opening connected with the air passage are also shaped to form airflow channels. The integral connection element connected with the air passage is then arranged to form an air channel leading to the air passage, while the integral connection element is arranged to form an air channel leading to the airflow control arrangement. Preferably, the airflow channels comprise portions which are oriented substantially in parallel with each other, and preferably, the airflow channels are also arranged to share one wall with each other.

According to one embodiment of the present invention the airflow control arrangement comprises four control arrangement openings adapted for connection with the integral connection elements, which four control arrangement openings are oriented perpendicularly to a common airflow control arrangement axis. This allows the use of already existing designs for efficient airflow control arrangements. Preferably the airflow control arrangement is arranged to deflect an airflow between 80-100 degrees from its previous path upon entering or leaving the control arrangement. In particular, the air passage is then connected with a control arrangement opening arranged perpendicular to, and located between, two opposite control arrangement openings. Thus the airflow inside the air passage may be directed to or from either of the two opposite control arrangement openings.

According to one embodiment of the present invention the air passage comprises a side-channel arranged to pass beside the airflow control arrangement on a side perpendicular to all four control arrangement openings. Thus the side-channel may pass around the airflow control arrangement without interfering with the connections to the control arrangement openings, meaning that the device may be constructed more compactly and more efficiently.

According to one embodiment of the present invention the air passage also comprises a cross-channel connected with the control arrangement opening to the airflow control arrangement, which cross-channel is arranged to lead its airflow in a direction perpendicular to all four control arrangement openings. Thus, the cross-channel also leads its airflow in parallel with the airflow control arrangement axis, giving the advantage that the cross-channel is arranged along the shortest route in a direction to allow passage beside the airflow control arrangement. Thus the device takes up less space. Preferably, the cross-channel is connected with the side-channel, wherein the side-channel is arranged to connect the cross-channel with the integral connection element connected with the air passage. Thus, the side-channel passes the airflow control arrangement on a side of the control arrangement on which no control arrangement openings are present. This gives the advantages that the side-channel may be shaped in any desired shape, and that the side-channel will not interfere with any of the integral connection elements connected to the control arrangement. Preferably the side-channel has a rectangular cross-section, and is provided with a flat outer surface. The device then becomes easier to install in a building and to connect to external equipment.

According to a further embodiment of the present invention two integral connection elements connected with control arrangement openings arranged perpendicular to the control arrangement opening to the air passage are arranged to form air channels leading to the airflow control arrangement and shaped to pass around the cross-channel, each on either side of the cross-channel. Preferably, the two integral connection elements connected with control arrangement openings arranged perpendicular to the control arrangement opening to the air passage are also arranged to form air channels leading to the airflow control arrangement, which air channels comprise portions which are substantially parallel with each other. Thus the cross channel is arranged in a space between the two air flow channels connected with the two opposite control arrangement openings, and the two airflow channels are in turn arranged to lead the airflows to pass around the cross channel on either side of the cross channel. Preferably, the control arrangement opening connected with the air passage is oriented to turn the airflow backwards. Preferably, the arrangement opening is oriented to turn the airflow backwards relative to itself. By arranging the control arrangement opening to turn the airflow backwards rather then sideways the cross-channel connected with the control arrangement opening may be arranged in between the airflow channels as described, rather than being arranged beside the airflow channels, a design allowing a decrease of the width or diameter of the device.

According to one embodiment of the present invention the control arrangement opening to the air passage and an opposite control arrangement opening are oriented to define a main airflow axis passing through the openings, wherein the two openings are oriented so that the main airflow axis is perpendicular to the common airflow control arrangement axis. Thus the paths for the airflows through the airflow control arrangement will be short. Preferably, the integral connection elements are arranged to form air channels leading towards the airflow control arrangement, wherein at least a portion of the air channels are oriented in parallel with and aligned with the main airflow axis extending through the device. Thus, the airflow paths through the device will be short, so that the airflows can be alternated without having to move large volumes of air back and forth before the altering of the airflows take effect. Preferably the airflow control arrangement is also arranged so that the main airflow axis is horizontal. Thus the airflows within the device are mostly flowing in the horizontal direction. In one embodiment of the present invention the airflow control arrangement is also oriented so that the common airflow control arrangement axis is arranged horizontally. Thus the two remaining control arrangement openings will be directed upwards and downwards. In another embodiment of the present invention the arrangement axis is arranged vertically, wherein the two remaining control arrangement openings instead are directed sideways.

According to one embodiment of the present invention the integral connection elements comprises integral connection openings for connection with ventilation components, wherein two integral connection openings are oriented in a first direction and two integral connection openings are oriented in a second, opposite direction, wherein the integral connection openings are directed parallel with and/or aligned with the main airflow axis. Preferably the integral connection elements are grouped together in pairs, wherein the device is easier to install and is more likely to fit the pre-existing ventilation systems in buildings. Preferably the integral connection elements also comprise integral connection openings, adapted for connecting with external air ducts, shaped so that the integral connection openings are substantially oriented in the same direction. Thus the installation of the device is simplified even further. Preferably the integral connections extend to the same extent so that their openings are substantially level with each other.

According to one embodiment of the present invention the airflow control arrangement comprises four control arrangement openings for connecting the airflow control arrangement with the integral connection elements and the air passage, and at least one shutter arranged to alternately allow the two airflows to pass between adjacent pairs of the control arrangement openings. Such a shutter has a long lifetime and is inexpensive to manufacture since standard components may be used. Preferably, the airflow control arrangement comprises a shutter rotatable between 80°-100° around a rotation axis.

According to one embodiment of the present invention the air passage comprises a by-pass channel arranged to let an airflow by-pass the heat-absorbing bodies. This gives the advantage that if the heat exchange is too efficient, so that the device over-shoots a desired indoor temperature, the exchange of heat energy may be decreased by letting part of the air pass through the by-pass channel, without shutting down the ventilation device entirely. Preferably a damper is arranged inside the by-pass channel to control the air flow through the by pass channel.

According to one embodiment of the present invention the integral connection elements and the airflow control arrangement are integrated within an airflow control module and share the same housing. Thus it is very easy to install the device into a ventilation system due to its modular design. According to a further embodiment of the present invention the device comprises a second, heat-absorbing module containing the two heat-absorbing bodies within the same housing. By letting the heat-absorbing module and the air flow control module be parts of the same device they may be designed to better fit each other in both dimensions and capacity. Preferably the airflow control module and the heat absorbing module are arranged as separate modules. This gives the advantage that each module may be removed from the ventilation system separately for replacement, repair or other maintenance work. The airflow control module and the heat-absorbing module are preferably adapted to be connected with each other, preferably directly connected with each other. Thus the volume of air between the modules, which must be moved when the airflows are alternated in order for new air to reach a heat absorbing body, is decreased.

According to one embodiment of the present invention the device comprises a second airflow control module adapted to be connected with the heat-absorbing module. By arranging air flow control modules that are connected on both sides of the heat-absorbing module the air ducts connected to the device may always carry the same airflow and always in the same direction. Thus the device may be positioned far from either or both of the indoor air or the outdoor air, without increasing the volumes of air that need to be moved through the air ducts before new air reaches the heat absorbing bodies when alternating the airflows.

In another embodiment of the present invention, two or three airflow alternating modules and/or heat absorbing modules may be arranged within the same housing, forming a separate unit. This gives the advantage that the entire unit may be removed or replaced for maintenance or repair.

BRIEF DESCRIPTION OF THE ATTACHED DRAWINGS

The invention is now to be described as a number of non-limiting examples of the invention with reference to the attached drawings.

DETAILED DESCRIPTION

Figure 1A:
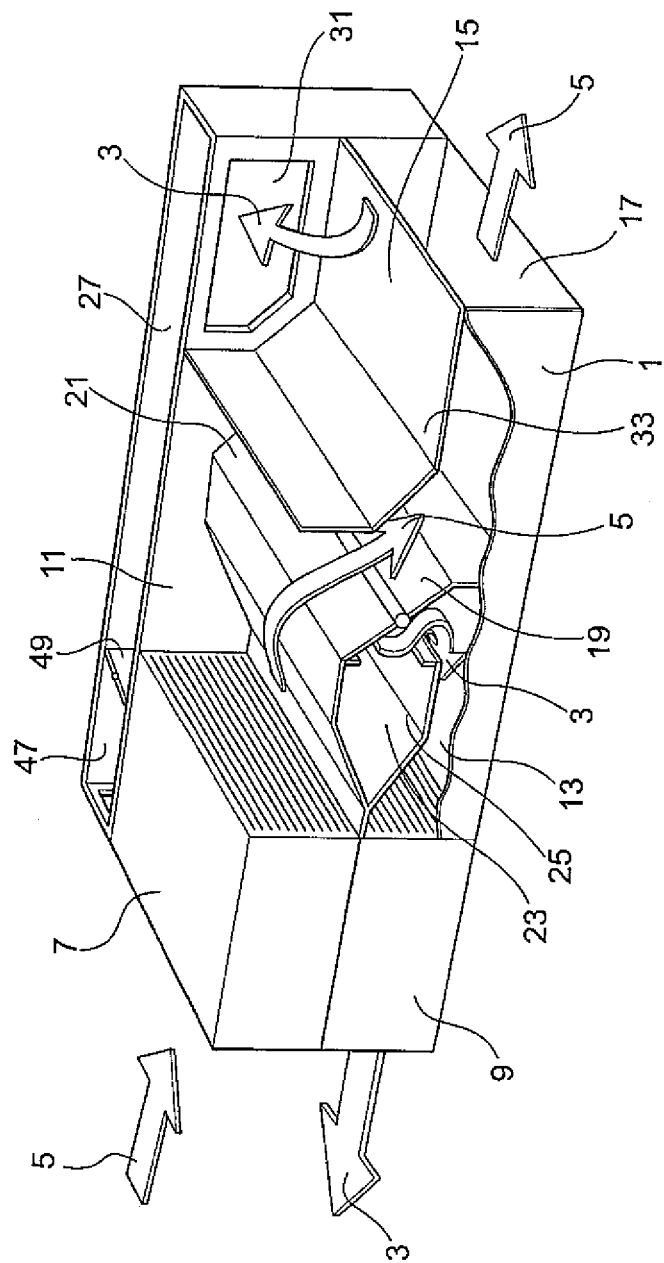
FIG. 1a shows a perspective view of a ventilation device according to one example of the present invention, with parts of the housing cut open for visibility.
Figure 1B:
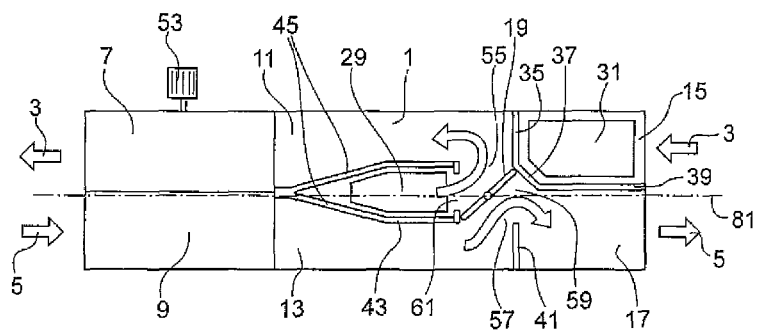
FIG. 1b shows a top view of the ventilation device in FIG. 1a, with the roof removed.
Figure 1C:
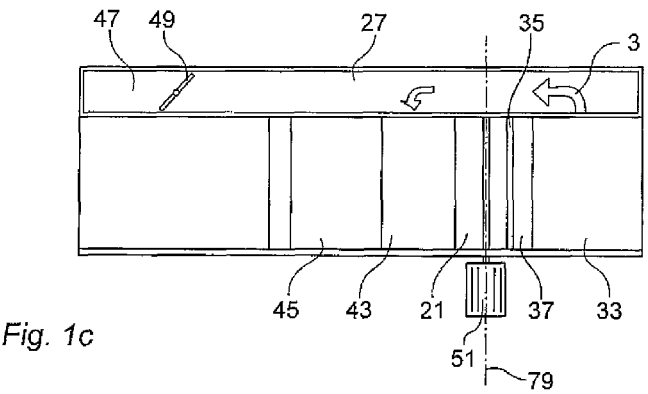
FIG. 1c shows a side view of the ventilation device in FIG. 1b, with the side panel removed.

In FIG. 1A-C a ventilation device 1 according to one example of the invention is shown, adapted for decreasing the heating (or cooling) costs for a building. The ventilation device 1 is adapted to alternately direct a first 3 and a second 5 airflow to a first 7 and a second 9 heat-absorbing body, respectively, in order to achieve a heat transfer between the two airflows. In this example, the first airflow 3 is colder than desired incoming air passing from the outdoor to the indoor of the building, while the second airflow 5 is outgoing air, passing from the indoor to the outdoor of the building.

In a first stage, the cold, incoming airflow 3 passes through and is heated by the first body 7, while cooling the first body 7.

Thus the cold incoming air passes through the first body and acts to cool the first body, that is to transfer cold thermal energy to the first body, from the air passing through the first body, so as to store the cold thermal energy in the first body. Of course this occurs only when a temperature of the cold incoming air is lower than the first body.

Also in the first stage the warm, outgoing airflow 5 passes through and is cooled by the second body 9, while heating the second body.

Thus the warm outgoing air passes through the second body and acts to heat the second body, that is to transfer hot thermal energy to the second body, from the air passing through the second body so as to store the hot thermal energy in the second body. Of course this occurs only when a temperature of the warm outgoing air is higher than the second body.

Thus in the first stage the cold incoming air passes through the first body and not through the second body while the warm outgoing air passes through the second body and not through the first body.

Subsequently, the airflows are interchanged in a second stage, so that the incoming, cold airflow 3 now passes through and is heated by the second body 9.

Thus the cold incoming air passes through the second body and is heated by the second body using the hot thermal energy previously stored in the first stage. Of course this occurs only when a temperature of the cold incoming air is lower than the second body.

Also in the second stage the warm, second airflow 5 passes through and heats the first heat-absorbing body 7.

Thus the warm second airflow passes through the first body and is heated by the first body using the cold thermal energy previously stored in the first stage. Of course this occurs only when a temperature of the warm second airflow is higher than the first body.

Thus in the second stage the warm second airflow air passes through the first body and not through the second body while the cold incoming air passes through the second body and not through the first body.

Thus, using the first and second stages, a heat-exchange between the two airflows 3, 5 is achieved.

According to the invention the ventilation device 1 further comprises an air passage 23 that connects one control arrangement opening located on one side of the airflow control arrangement in fluid connection with an integral connection element located on another side of the airflow control arrangement. In this example the air passage 23 is adapted to connect the fourth control arrangement opening 61 with the third integral connection element 15. However, in another example the air passage could just as well be connected to anyone of the other integral connection elements. In this example the third integral connection element 15 and the fourth control arrangement opening 61 are located at opposite sides of the airflow control arrangement 19. The air passage 23 is thus arranged to pass around the airflow control arrangement 19 in order to connect the control arrangement opening 61 with the third integral connection element 15. Due to the air passage 23 it is possible to connect a control arrangement opening with an integral connection element located at another side of the airflow control arrangement, so that the integral connection element may be positioned and oriented in any desired location and direction in the device 1, regardless of the orientation of the corresponding control arrangement opening. This in turn simplifies the installation of the device, since the device may be designed to fit a specific ventilation system, and also allows a more compact design of the device.

In this example the shutter 21 is provided in the form of a shutter plate mounted on a shaft, so that the shutter is rotatable around an axis of rotation. In this example the shutter 21 is rotatable 80°-100°, between a first state, as shown in FIG. 1A, and a second state, as shown in FIG. 1B. The shutter 21 thus deflects the airflows 80°-100°, preferably 90°, in relation to their previous flow direction. In this example the shutter is adapted to deflect both airflows at the same time, one on each side of the shutter 21, so that only one shutter 21 is necessary. However, it is conceivable that an air flow control arrangement in accordance with the present invention comprises two or more shutters, for example when dealing with larger air flows, and such arrangements are considered to be part of the scope of the present application. The shutter 21 is very resistant to wear, which is necessary due to the many times the shutter is rotated. Normally, a ventilation device is adapted to alternate the airflows, and thus to rotate the shutter, once every minute, meaning that the shutter is rotated 1440 times each day.

In this example, the four control arrangement openings 55, 57, 59, 61 of the airflow control arrangement 19 are oriented perpendicularly to a common airflow control arrangement axis 79. The openings 55, 57, 59, 61 are further arranged spaced around the axis 79 and with the axis in the centre. In this example the common airflow control arrangement axis 79 coincides with the shutter shaft and thus the rotational axis of the shutter 21. The four control arrangement openings 55, 57, 59, 61 are further arranged to open one on each side of the airflow control arrangement 19, so that the control arrangement openings are mutually perpendicular and/or mutually opposite to each other. By arranging the control arrangement openings perpendicularly and or oppositely, and by letting the shutter plate 21 be rotatable 80°-100°, a very large part of the total volume occupied by the airflow control arrangement is used for conducting the airflows, wherein the arrangement may be decreased in size while keeping a high flow capacity and low pressure drop.

In this example, three of the integral connection elements 11, 13, 17 are adapted to form channels leading to the airflow control arrangement 19, so that three of the control arrangement openings 55, 57, 59 are directly connected with one integral connection element 11, 13, 17 each. In this example the first integral connection element is connected with the first control arrangement opening 55, the second integral connection element 13 is connected with the second control arrangement opening 57, and the fourth integral connection element 17 is connected with the third control arrangement opening 59. The third integral connection element 15 is adapted to form a channel leading to the air passage 23, which in turn is connected with the fourth control arrangement opening 61. In this example, the four integral connection elements 11, 13, 15, 17 form channels which are substantially parallel, or aligned, with each other. This arrangement simplifies installation of the device 1, since an operator will more easily be able to identify which opening should be connected with which ventilation component, such as an air duct or heat-absorbing body.

The airflow control arrangement 19 is further oriented so that the control arrangement opening 61 to the air passage 23 and an opposite control arrangement opening 59 are oriented to define a main airflow axis 81 passing through the openings, wherein the two openings 59, 61 are oriented so that the main airflow axis is perpendicular to the common airflow control arrangement axis 79. This gives the advantage that the airflow control arrangement 19 is oriented to allow short routes through the airflow control arrangement 19 for the two airflows 3, 5. Furthermore, the integral connection elements are arranged to form channels, at least a part of which are arranged substantially aligned with the main flow axis 81 through the device.

In this example, the two remaining control arrangement openings 55, 57 are arranged perpendicular to the main flow axis, allowing use of the shutter rotatable 80°-100°, preferably 90°, for directing airflows to the third and fourth openings 59, 61. In this example the airflow control arrangement 19 is oriented so that the arrangement axis 79 is horizontal, wherein the first and the second control arrangement openings 55, 57 are directed upwards and downwards, respectively. In another embodiment the arrangement axis 79 may be arranged vertically, wherein the two control arrangement openings would be directed sideways. It is also conceivable that a ventilation device in accordance with the present invention has an airflow control arrangement oriented in any suitable and/or desired direction.

In this example the first 11 and the second 13 integral connection elements are adapted to form substantially parallel channels leading to the airflow control arrangement 19, and are oriented in a direction towards the two bodies 7, 9. Since the first and second control arrangement openings 55, 57 are perpendicular to the main flow axis 81, and thus to the direction of the channels, the first arrangement axis opens into the floor of the first channel 11, and the second control arrangement opening 57 opens into the ceiling of the second channel 13. Hence, the airflows are turned upwards and downwards at an angle of between 80°-100° upon entering the airflow control arrangement. The airflow control arrangement 19 is adapted to turn the airflows a further 80°-100° by use of the shutter 21, wherein, depending on the present state of the shutter, one airflow will be turned substantially 180° in total and turned backwards into the fourth control arrangement opening 61, while the other airflow will be continuing in the forward direction into the third control arrangement opening 59. Thus the airflows through the first 11 and the second integral connection elements 13 will be deflected either to the left or right, in the backward or forward direction, and aligned with the main flow axis.

The fourth integral connection element 17 is in this example arranged to be connected with, and to form an airflow channel to, the third control arrangement opening 59, that is opposite the opening to the air channel 23. Thus, an airflow between the fourth integral connection element 17 and the third control arrangement opening 59 will continue in a forward direction.

The air passage 23 comprises a cross channel 25 arranged connected with the fourth control arrangement opening 61 for fluid communication with the airflow control arrangement 19. The cross-channel 25 is arranged to extend in a direction perpendicular to all four control arrangement openings, and thus in parallel with the arrangement axis and the rotational axis of the shutter 21. Thus the cross-channel is adapted to lead an airflow the shortest route to a location beside the airflow control arrangement 19, in order for the airflow to pass around the control arrangement 19. The cross-channel 25 is thus arranged to turn the airflow an additional 90° in a sideway direction.

Since, the arrangement axis in this example is arranged perpendicular to the main flow axis, the cross-channel is likewise arranged perpendicular to the main flow axis, giving the advantage that the cross-channel will occupy a small volume in the space needed for the first 11 and the second integral connection elements 13 for forming the channels to the first 55 and second control arrangement openings 57. The first 11 and second integral connection elements 13 are thus arranged to form channels arranged to pass around the cross-channel 25 on either side of the cross-channel.

The air passage 23 further comprises a side channel 27 arranged to pass beside the air flow control arrangement 19. The side channel 27 is adapted to be connected with the cross-channel via a first side-opening 29, and with the third integral connection element 15 via a second side opening 31. The side channel 27 thus connects the cross channel 25 with the third integral connection element 15. The side channel 27 is arranged to lead an air flow from one end of the air flow control arrangement 19 to the other side of the air flow control arrangement 19, so that the first airflow 3, entering in the third integral connection element 15, may be conducted to the fourth control arrangement opening 61 and enter the airflow control arrangement 61. This gives a very compact design and also allows a grouping together of the integral connection elements so that the device can be easily installed in a ventilation system.

The ventilation device further comprises a by-pass channel 47 arranged to let an air flow by-pass the heat-absorbing bodies 7, 9. In this example the by-pass channel 47 is arranged in conjunction with the side channel 27. Thus the exchange of heat energy may be decreased by letting part of the first airflow 3 pass through the by-pass channel 47 instead of the heat-absorbing bodies 7, 9. In this example the ventilation device 1 also comprises a damper 49 arranged inside the by-pass channel in order to control the airflow through the by-pass channel.

The ventilation device 1 comprises a first internal wall 33. The wall 33 is preferably manufactured from sheet metal bent into a desired shape. The internal wall 33 comprises a first wall portion 35 adapted to separate the first integral connection element 11 from the third integral connection element 15. The internal wall 33 also comprises a second wall portion 37 adapted to separate the third integral connection element from the airflow control arrangement 19, but also to engage with the shutter 21 in its second state, in order to prevent an airflow path between the first integral connection element 11 and the fourth integral connection element 17. The second portion 37 is beveled in relation to the first portion 35, so that the wall portion 37 forms a beveled air channel through the airflow control arrangement 19 in conjunction with the shutter 21, in its first state. Thus the pressure drop through the airflow control arrangement 19 is decreased. The first wall further comprises a third portion 39 adapted to separate the third integral connection element 15 from the fourth integral connection element 17. Thus the third integral connection element 15 and the fourth integral connection element 17 share the common wall portion 39, wherein the connections 15, 17 may be arranged closer to each other, leading to a more compact device.

The ventilation device 1 further comprises a second internal wall 41 arranged to separate the second 13 and fourth integral connection elements 17 from each other. The second wall 41 is also arranged to engage with the shutter 21 when it is in its first state to force the first airflow 3 into the second integral connection element 13. The second wall 41 is also arranged to engage with the shutter 21 in its first state, in order to prevent an airflow path between the second integral connection element 13 and the fourth integral connection element 17.

The ventilation device 1 further comprises a third internal wall 43. The third internal wall 43 is arranged to define the cross channel 25 and to separate the cross channel 25 from the first 11 and the second integral connection elements 13. The third wall 43 thus comprises a wall portion 45 that is cylindrical in shape for forming the cross-channel 25 inside the cylinder. The wall portion 45 also comprises an opening forming the fourth control arrangement opening 61 into the cross-channel 25. The wall portion 45 is provided with bent edges on either side of the opening 61, for engagement with the shutter 21, in order to prevent undesired airflows. The wall portion 45 also comprises bevelled portions forming parts of the channels formed by the first 11 and second integral connection elements 13 arranged to form the channels to pass around the cross-channel 25.

The three internal walls 33, 41, 43 are thus arranged to form the inner structure of the device 1 and to define the internal channels and the space harbouring the airflow control arrangement 19 within the device 1. The airflow control arrangement 19 is thus arranged in a space defined by the internal walls 33, 41, 43 and is adapted to direct the air flow through the device in combination with the geometry of the walls 33, 41, 43.

The ventilation device 1 further comprises a first drive unit 51 arranged to control the movement and state of the shutter 21, in the airflow control arrangement. The ventilation device 1 further comprises a second drive unit 53 adapted to control the movement and state of the damper arranged in the by pass channel 47. A drive unit may be of any suitable type, but is preferably either electrical or pneumatic.

The integral connection elements 11, 13, 15, 17 are adapted to be connected with air ducts, with heat-absorbing bodies, or other components within the ventilation system. The integral connection elements hence comprise openings adapted to be connected with an external ventilation component for transferring an airflow between the integral connection element and the component. The openings of the integral connection elements 11, 13, 15, 17 are also adapted to fit the openings to the air ducts or to the heat-absorbing bodies and may, for example, comprise different types of fasteners or seals to establish the connection.

The integral connection elements 11, 13, 15, 17 are in this example grouped close together in pairs, and are further grouped so that each pair of integral connection elements are adapted to receive different airflows. In this example the integral connection elements 15, 17 adapted to be connected with air ducts for conducting the incoming 3 and outgoing airflow 5 are grouped closely together, and the integral connection elements 11, 13 adapted to be connected with the heat-absorbing bodies 7, 9 are also grouped closely together. Air ducts for incoming and outgoing air flows are usually positioned close to each other in ventilation systems due to easier construction. Furthermore it is an advantage to position the heat-absorbing bodies close to each other since both air flows are to be alternated to the respective bodies. Thus the installation of the device is simplified. In this example each pair of integral connection elements are adapted to form channels leading to opposite control arrangement openings.

The integral connection elements 11, 13, 15, 17 are further shaped so that each pair extend to an equal extent, so that the openings are level with each other. Thus it is easier to install the ventilation device 1 into a ventilation system and to connect the integral connection elements to the ventilation components. In this example the integral connection elements are substantially rectangular in cross-section. Rectangular shapes are easy to manufacture, giving a less expensive device 1. The channels formed by the integral connection elements 11, 13, 15, 17 are furthermore substantially parallel, meaning that the shape of the ventilation device will be more compact and streamlined.

In the following the function of the ventilation device is described in closer detail. When the shutter plate 21 is in the first state, as is shown in FIG. 1*a*, the incoming, cold airflow 3 enters the third integral connection element 15, and continues through the air passage 23 to the air flow control arrangement 19. The shutter plate 21 then deflects the first airflow 3 to pass into the second integral connection element 13 and further into the second heat-absorbing body 9. The incoming, cold first airflow 3 thus becomes heated by the warm heat-absorbing body 9, and is then carried into the building as warm incoming ventilation air. When passing the second body 9 the first airflow 3 also cools the heat-absorbing body 9.

At the same time, the outgoing airflow 5, which is supplied from the warm indoor air, passes through the first heat-absorbing body 7, wherein the first heat-absorbing body 7 absorbs heat from the warm outgoing airflow 5. The outgoing second airflow 5 then continues into the first integral connection element 11, enters the airflow control arrangement 19 and is deflected by the shutter plate 21 to continue into the fourth integral connection element 17 and further on to the outside of the building.

Following a rotation of the shutter plate 21, the shutter plate 21 assumes the second state as shown in FIG. 1*b*. Thus the incoming first airflow 3 is now instead deflected to enter the first integral connection element 11 and is passed through the now warm first heat-absorbing body 7, while the outgoing second airflow 5 is deflected to enter the second integral connection element and the now cold second heat-absorbing body 9. Thus the incoming airflow is now heated by the first body 7, while the outgoing airflow heats the second body 9.

Figure 2:
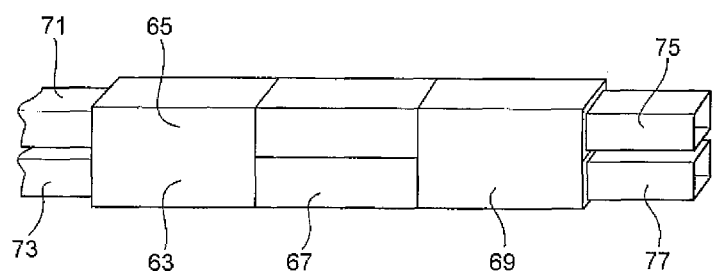
FIG. 2 shows a ventilation device with a modular design, comprising airflow control modules and a heat-absorbing module.

In FIG. 2 another example of a ventilation device 63 according to the invention is shown. The ventilation device 63 comprises a first air flow control module comprise integral connection elements and an air flow control arrangement as described in relation to FIG. 1A-C integrated within the module. The device 63 further comprises a heat-absorbing module 67 comprising two heat-absorbing bodies. Due to the modular design of the ventilation device 63 it is very easy to replace any or all of the modules 65, 67 by simply disconnecting and removing the desired module and replacing it with a new module in the event of errors. Furthermore it is easy to remove a module from the device 63, in case any of the modules needs maintenance or repair.

The ventilation device 63 further comprises a second air flow control module 69 arranged at the other side of the heat-absorbing module 67. Thus the ventilation device 63 is adapted to alternate the air flows between the heat-absorbing bodies on both sides of the heat-absorbing module 67. Thus there will be a minimized volume of old air that has to be moved at each exchange of the air flows due to that old air needs to be moved backwards before fresh air can be brought into contact with the heat-absorbing bodies respectively. Thus the efficiency of the ventilation device 63 increases and also the ventilation device 63 may be positioned far away from both the indoor air supply and the outdoor air without the necessity of moving large amounts of air in the ventilation ducts during the changeover from one shutter plate position to another.

The first airflow control module 65 is connected to one end of the heat-absorbing module 67 for conducting the airflows between the modules 65, 67. In this example the first airflow control module 65 is directly connected to the heat-absorbing module 67. Similarly, the second airflow control module is directly connected to the other end of the heat-absorbing module 67, for conduction of the airflows between the modules 67, 69.

The modules 65, 67, 69 are in this example substantially box-like with a rectangular shape, whereby the modules are more easily installed. The modules are further adapted to lead the airflows through the modules, so that the airflows pass through all three modules.

In FIG. 2 external air ducts 71, 73, 75, 77 are also shown connected with the device 63 for conducting an incoming and an outgoing airflow to the device. In this example the first air duct 71 is adapted to lead the incoming airflow into the device 65 from outdoors, the second air duct 73 is adapted to lead the outgoing airflow outdoors, the third air duct 75 is adapted to lead the incoming airflow indoors, and the fourth air duct 77 is adapted to lead the outgoing airflow from indoors and into the device.

The invention is not limited to the examples shown but may be varied freely within the framework of the following claims. In particular, the connection of ventilation components to the integral connection elements need not be performed as shown in the examples, but may be connected in any suitable manner. Furthermore, other types of ventilation components, such as filters, fans etc. may also be connected to the integral connection elements. The device may also be rotated, so that for example the side channel is located on top of the device rather than to one side of the device, and also the cross-channel may be arranged vertically instead of horizontally. Furthermore the internal walls of the device may be shaped according to many different configurations without departing from the scope of the invention.

The invention claimed is:

1. A ventilation apparatus in a building connected between an exterior and an interior of the building so that:
   in a cooling operation, when air in the exterior is hotter than air in the interior, heat is extracted from an exterior air flow passing from the exterior to the interior to cool the exterior air flow passing to the interior; and
   in a heating operation, when the exterior air is cooler than the interior air, heat is extracted from an interior air flow passing to the exterior from the interior to heat the exterior air flow passing to the interior;
   the apparatus comprising:
   a first duct;
   a second duct;
   a first heat absorbing body connected to an end of the first duct;
   a second heat absorbing body connected to an end of the second duct;
   the first heat absorbing body being arranged so as to:
   a) transfer hot thermal energy to the first heat absorbing body from air passing through the first heat absorbing body when a temperature of the air is higher than the first heat absorbing body so as to store hot thermal energy in the first heat absorbing body; and
   b) transfer cold thermal energy to the first heat absorbing body from air passing through the first heat absorbing body when a temperature of the air is lower than the first heat absorbing body so as to store cold thermal energy in the first heat absorbing body;

the second heat absorbing body being arranged so as to:
a) transfer hot thermal energy to the second heat absorbing body from air passing through the second heat absorbing body when a temperature of the air is higher than the second heat absorbing body so as to store hot thermal energy in the second heat absorbing body; and
b) transfer cold thermal energy to the second heat absorbing body from air passing through the second heat absorbing body when a temperature of the air is lower than the second heat absorbing body so as to store cold thermal energy in the second heat absorbing body;

the first and second heat absorbing bodies being arranged such that:

in a first mode of the cooling operation the interior air flow passes through the single airflow path of the first heat absorbing body to the exterior to store cold thermal energy in the first heat absorbing body while the exterior air flow does not pass through the first heat absorbing body but instead passes through the second heat absorbing body to the interior;

and in a second mode of the cooling operation the interior air flow passes through the second heat absorbing body to the exterior to store cold thermal energy in the second heat absorbing body while the exterior air flow does not pass through the second heat absorbing body but instead passes through the first heat absorbing body to the interior while being cooled by the cold thermal energy stored in the first heat absorbing body which has been cooled in the first mode;

in a first mode of the heating operation the interior air flow passes through the first heat absorbing body to the exterior to store hot thermal energy in the first heat absorbing body while the exterior air flow does not pass through the first heat absorbing body but instead passes through the second heat absorbing body to the interior;

and in a second mode of the cooling operation the interior air flow passes through the second heat absorbing body to the exterior to store hot thermal energy in the second heat absorbing body while the exterior air flow does not pass through the second heat absorbing body but instead passes through the first heat absorbing body to the interior while being heated by the hot thermal energy stored in first heat absorbing body which has been heated in the first mode;

the first and second heat absorbing bodies each being rectangular with first and second air passage faces at opposite ends thereof and four closed sides between said ends;

the first and second heat absorbing bodies each having one of said first and second air passage faces connected to said exterior and the other of said first and second air passage faces connected to the interior;

the first and second heat absorbing bodies each mounted side by side with one of said four closed sides of the first heat absorbing body lying adjacent to and parallel to one of said four closed sides of the second heat absorbing body and with the first air passage face of the first heat absorbing body lying side by side with the first air passage face of the second heat absorbing body and with the second air passage face of the first heat absorbing body lying side by side with the second air passage face of the second heat absorbing body;

the first duct having a first end connected only to the first air passage face of the first heat absorbing body and a second end;

the second duct having a first end connected only to the first air passage face of the second heat absorbing body and a second end;

the first duct being parallel to and side by side with the second duct;

and an airflow control arrangement connected between the first and second ducts and operable on airflow in the first and second ducts to alternately move between:
a first condition in which airflow passes through the first duct between the first and second ends thereof and airflow passes through the second duct between the first and second ends thereof;
and a second condition in which airflow is transferred so as to pass between the first end of the first duct and the second end of the second duct and so as to pass between the second end of the first duct and the first end of the second duct.

2. The ventilation apparatus according to claim 1 wherein the second end of the first and second ducts is connected to the interior of the building.

3. The ventilation apparatus according to claim 1 the first and second ducts have a common wall such that the first duct is on one side of the common wall and the second duct is on the other side of the common wall.

4. The ventilation apparatus according to claim 3 wherein airflow control arrangement includes a part thereof in the common wall.

5. The ventilation apparatus according to claim 3 wherein airflow control arrangement includes at least one flap valve in the common wall.

6. The ventilation apparatus according to claim 1 wherein the first and second heat absorbing bodies are stacked one on top of the other and the first and second ducts are stacked one on top of the other.

7. The ventilation apparatus according to claim 1 wherein the first air passage faces lie in a common plane and the second air passage faces lie in a common plane.

* * * * *